United States Patent Office 3,183,247
Patented May 11, 1965

3,183,247
GALACTONOLACTONES, DERIVATIVES THEREOF, AND PROCESS FOR THEIR PREPARATION
Joseph Kiss and Hans Spiegelberg, Basel, and Bruno Peter Vaterlaus, Binningen, Switzerland, assignors to Hoffmann-La Roche Inc., Nutley, N.J., a corporation of New Jersey
No Drawing. Filed Sept. 11, 1961, Ser. No. 137,045
Claims priority, application Switzerland, Sept. 13, 1960, 10,386/60
6 Claims. (Cl. 260—343.6)

The present invention relates to γ-D-galactonolactones, to derivatives thereof, and to processes for their preparation.

One feature of the invention relates to the solvolysis of a 2-O-lower alkyl-3,5,6-tri-O-benzyl-D-gluconic acid, or a functional derivative thereof, esterified in the 4-position with a sulfonic acid moiety. The sulfonic acid, with which the 4-position of the above compound is esterified, is an aliphatic or aromatic hydrocarbon sulfonic acid, for example, lower alkyl sulfonic acids, e.g., methanesulfonic acid, lower alkyl or halo substituted benzene sulfonic acids, e.g., p-toluenesulfonic acid, p-bromobenzenesulfonic acid, etc. The lower alkyl group in the 2-position can be any lower alkyl group, for example, methyl, ethyl, propyl, butyl, isobutyl, etc.

The functional derivative of D-gluconic acid referred to above can be a substituted or unsubstituted acid amide, such as an N-mono lower alkyl, or N,N-dilower alkyl acid amide. N-mono lower alkyl, especially the N-methyl amide is preferred. Lower alkyl esters and the nitrile can also be used. 2-O-methyl-3,5,6-tri-O-benzyl-4-O-mesyl-D-glucon-N-methylamide is the preferred starting material.

The substituted D-gluconic acids and their functional derivatives used in the process of the invention are new compounds which can be prepared from the 2-O-lower alkyl - 3,5,6 - tri-O-benzyl alkyl-D-glucofuranosides. The anomer mixture of 2-O-methyl-3,5,6-tri-O-benzyl lower alkyl-D-glucofuranoside is prepared from D-glucose by way of its 1,2-mono acetone derivative, the last-named compound being tribenzylated, hydrolized in the 1- and 2-positions, and then lower alkylated, e.g., methylated.

In order to convert the anomer mixture of the D-glucofuranoside into the amide starting material used in the present invention the D-glucofuranoside mixture is subjected to acid catalyzed hydrolysis to form the corresponding D-glucofuranose. Aqueous acetic acid having a concentration of 50% or more can be used for the hydrolysis. It is preferable to select a concentration at which the glucofuranoside goes into solution upon warming of the mixture. The hydrolysis can also take place by addition of mineral acids, e.g., HCl, $H_2SO_4$, $H_3PO_4$, etc., p-toluenesulfonic acid or metal halides of metals of the second group of the periodic system, e.g., $MgCl_2$, $CaBr_2$, $BaI_2$, $SrCl_2$, etc.

Next, the D-glucofuranose is oxidized to the corresponding γ-D-gluconolactone. A bromide-cation producing reagent is suitably employed for the oxidation such as, for example, an N-bromoacylamide, e.g., N-bromosuccinimide, N-bromoacetamide, bromourea, etc. Oxidation with bromourea is the preferred method of carrying out this step in the process. However, the oxidation can be carried out with other agents such as, for example, chromic oxide-pyridine complex in pyridine.

The corresponding D-gluconamide is prepared from the above obtained γ-lactones through ammonolysis. The opening of the lactone ring takes place with ammonia or with primary or secondary lower alkyl or dialkyl amines. The ammonolysis with monomethylamine in methanol is preferred. D-glucon-N-monomethylamide which results therefrom is especially preferred for the previously discussed esterification with a sulfonic acid.

Then the free hydroxyl group in the 4-position of the D-gluconamide is esterified with a sulfonic acid whereupon the starting material for the present process is obtained. The esterification proceeds best by reaction with a lower aliphatic sulfonyl halide, e.g., the chloride, bromide, or iodide. The preferred procedure involves the use of methanesulfonyl chloride and a solvent such as methylene chloride in the presence of pyridine at a temperature range of about 0 to about 5° C. The mesylate precipitated thereby exhibits especially good tendency to crystallize. Aromatic sulfonyl halides such as p-toluenesulfonyl chloride or p-bromobenzenesulfonyl chloride can also be used.

If it is desired to use an ester of a substituted D-gluconic acid in the process of the invention, the ester can be prepared by reaction of the above obtained γ-D-gluconolactone with an alcohol. The esterification is preferably carried out by heating the lactone in alcoholic solution, for example, in a lower alkanol such as methanol or ethanol, in the presence of an acid agent, for example, a mineral acid such as hydrochloric acid, whereupon the corresponding ester is formed and isolated. The reaction product is then reacted with a sulfonic acid.

Nitriles can also be used in the first step of the process of the invention. Such nitriles can be prepared by reaction of an above described 2-O-lower alkyl-3,5,6-tri-O-benzyl-D-glucofuranose with hydroxylamine in alcoholic solution, subsequent dehydration of the oxime so formed and further reaction with a sulfonic acid.

The solvolysis step of the invention with the 2-O-lower alkyl-3,5,6-tri-O-benzyl-D-gluconic acid, or functional derivative thereof, which is esterified in the 4-position with a sulfonic acid moiety, is carried out in a water miscible organic solvent which contains at least 1 mole of water per mole of gluconic acid or derivative thereof. It is desirable to carry out this solvolysis at an elevated temperature, for example, between about 25 to about 100° C. Examples of water-miscible organic solvents than can be employed include acetic acid, aqueous acetonitrile, nitromethane, dimethylformamide, dimethylsulfoxide, etc. The use of acetic acid is especially preferred because of the purity of the product obtained therefrom. The solvolysis can also take place in the presence of an alkali metal salt of a lower aliphatic or monocyclic aromatic carboxylic acid, for example, sodium acetate or sodium benzoate.

A preferred process consists of heating 2-O-methyl-3,5,6-tri-O-benzyl-4-O-mesyl-N-methyl-D-gluconamide in about 66% aqueous acetic acid for 10 to 15 hours under reflux, whereupon, after evaporation of the solvent, usual work up, and ether extraction, 2-O-methyl-3,5,6-tri-O-benzyl-γ-D-galactonolactone is obtained in almost quantitative yield. The γ-D-galactonolactones obtained by the process of the invention can be reacted further as follows, the following reaction steps also comprising part of the instant invention.

By reaction of the lactones with a lower alkyl magnesium halide Grignard reagent employing 1 mole of lactone to 2 moles of Grignard reagent, and hydrolyzing the addition product there is formed a 1,1-dilower alkyl-2-O-lower alkyl-3,5,6-tri-O-benzyl-D-galactonohexitol. The Grignard reagent is preferably a methyl magnesium halide, e.g., the iodide, bromide, or chloride.

The free hydroxyl groups in the 1- and 4-positions of the above obtained hydrolysis product can be etherified by further reaction through the addition of dihydropyran in the presence of an acid agent whereupon the corresponding substituted 1,4-di-O-tetrahydropyranyl-D-galactonohexitol is formed. The dihydropyran is preferably used in excess in order to insure solution of the starting material. To start the reaction p-toluenesulfonic acid is preferably added and the reaction mixture allowed to stand for several hours at room temperature. The free hydroxyl groups in the 1- and 4-positions of the substituted hexitols, i.e., the hydrolysis products of the Grignard reaction, can also be partially blocked. By the use of a molar quantity or a slight excess of a lower aliphatic, a lower monocyclic aralkyl, or a monocyclic aromatic carboxylic acid, or a functional derivative thereof (capable of reaction with a free hydroxyl group), a phosphoric acid ester or a nitrosyl halide, only the secondary hydroxyl group in the 4-position will be esterified. Benzoic acid or ring-substituted benzoic acids or functional derivatives thereof, as, for example, the corresponding benzoyl halides, e.g., p-methoxybenzoyl chloride, p-nitrobenzoyl chloride, benzoyl chloride or phosphonium halides, e.g., diphenylphosphonium chloride, or dibenzylphosphonium chloride, are suitable esterifying agents. Benzoyl chloride in pyridine is a preferred acylating agent.

In the next step of the process of the invention the 1,1-dilower alkyl-2-O-lower alkyl-3,5,6-tri-O-benzyl-4-O-acyl-D-galactonohexitol can be reductively debenzylated to produce the corresponding 1,1-dilower alkyl-2-O-lower alkyl-4-O-acyl-D-galactonohexitol. The hydrogenolysis can take place catalytically or chemically, with the catalytic hydrogenation, which is the preferred process, being carried out in the presence of a hydrogenation catalyst. It is necessary, to employ, for example, Raney nickel, platinum or, especially, palladium. The hydrogenation is accelerated by the addition of acid. It is, however, important to bear in mind that with a large acidity the acyl group wanders from the $C_4$ to the $C_6$-position. The reduction temperature should not exceed about 50° C. A preferred method of operation consists in dissolving the starting material in methanol and adding solid carbon dioxide thereto as the acid. The hydrogenation is carried out in the presence of a palladium catalyst at room temperature. The hydrogenolysis can also be carried out by the use of chemical agents, for example, in liquid ammonia with the help of an alkali metal in the presence of a solvent such as a cyclic ether, for example dioxane or tetrahydrofuran.

The hydrogenation products can be treated in a further step, which comprises part of the invention, to a glycol splitting reaction, whereby through oxidative degradation of the terminal hydroxymethyl group, a 5,5-dilower alkyl-4-O-lower alkyl-2-O-acyl-L-lyxopyranose is formed. As the oxidation agent, lead tetraacetate, sodium periodate, or periodic acid can be employed. The reaction is suitably carried out in an organic solvent, e.g. methylene chloride, benzene, chloroform, acetic acid, etc. A preferred method of proceeding involves the use of lead tetraacetate in methylene chloride at room temperature.

In a last reaction step within the process of the invention the above obtained oxidation product can be acetalized with an acetalizing agent such as a lower aliphatic or lower monocyclic araliphatic alcohol, for example methanol, ethanol, or benzyl alcohol. The reaction is carried out through the addition of a catalytic quantity of an acid. The acids that can be employed include mineral acids, e.g., hydrochloric, sulfuric, etc., or the sulfonic acids, e.g., p-toluenesulfonic acid. A preferred process for the acetalization reaction involves dissolving the oxidation product in methanol and to the resulting solution heated to the boiling point, dropping in acetyl chloride. The necessary quantity of hydrogen chloride is thereby formed in order to ensure acetalization. The resulting methyl-L-lyxopyranoside is worked up in the usual manner.

The galactonolactones as well as the conversion products formed by the processes of the invention are new compounds which are intermediates in the preparation of noviose and noviose derivatives which in turn are intermediates in the synthesis of novobiocin and similar compounds. Noviose can, e.g., be prepared by saponification of the acyl group of 5,5-dimethyl-4-O-methyl-2-O-acyl-L-lyxopyranose. Compounds homologous to noviose are obtained when using 5,5-di(lower alkyl)-4-O-lower alkyl-2-O-acyl-L-lyxopyranose as starting materials. Treatment of 5,5-di(lower alkyl)-4-O-lower alkyl-2-O-acyl alkyl-L-lyxopyranosides with alkali gives 5,5-di(lower alkyl)-4-O-lower alkyl alkyl-L-lyxopyranosides. 5,5-dimethyl-4-O-methyl methyl-L-lyxopyranoside (i.e., methyl novioside) is a useful compound in the synthesis of novobiocin, e.g., according to U.S. pat spec. 2,938,025.

The invention will be better understood by reference to the following examples which are given for purposes of illustration and are not meant to limit the invention.

EXAMPLE 1

2-O-methyl-3,5,6-tri-O-benzyl-D-glucofuranose 200 g. of 2-O-methyl-3,5,6-tri-O-benzyl-methyl-D-glucofuranoside (prepared according to the procedure of F. Weygand and O. Trauth, Ber. 85, 57–60 [1952]) is dissolved in 2000 ml. of 66% acetic acid and heated under reflux for 15 hours. The solution is allowed to cool and the solvent distilled off under the vacuum of a water pump at a bath temperature of 70° C. The residue, a viscous oil, is taken up in ether and alternately washed with 3 N sodium hydroxide solution and water. After drying and evaporation of the ether, 190 g. of the desired material is obtained in the form of a viscous oil.

2-O-methyl-3,5,6-tri-O-benzyl-γ-gluconolactone

In a 5-liter round-bottom flask fitted with a stirrer, dropping funnel and thermometer in an ice bath, 133 g. of urea and 126 g. of calcium carbonate are introduced and slurried with 133 ml. of water. Into the pasty mass 95 ml. of bromine are dropped slowly and under cooling with ice during the course of 2–3 hours. After stirring for an additional 2 hours, a solution of 200 g. of 2-O-methyl-3,5,6-tri-O-benzyl-D-glucofuranose in 1800 ml. of methanol is added to the resulting mixture at a temperature of 5–20° during the course of 30 minutes. After several hours' stirring the mixture is diluted with water and the aqueous alcohol phase extracted several times with ether. The combined ether solutions are washed consecutively with water, sodium bisulfite solution, sodium bicarbonate solution, and again with water, and then dried and concentrated. There is obtained almost a quantitative yield of 2-O-methy-3,5,6-tri-O-benzyl-γ-D-gluconolactone in the form of an oil which can be used directly for further reaction.

The oxidation can also be carried out as follows: 100 g. of 2-O-methyl-3,5,6-tri-O-benzyl-D-glucofuranose is dissolved with stirring in 1000 ml. of methanol and treated with 40 g. of barium carbonate. Into the solution, maintained at a temperature of 0–5° by cooling with ice, is dropped a solution of 45 g. of N-bromoacetamide in 500 ml. of methanol during the course of one minute. The mixture is stirred at the same temperature for 4 hours, then the solution of 45 g. of N-bromoacetamide in 500 ml. of methanol is added thereto, and the resulting mixture allowed to stand for several days at 0°. Thereafter the orange-red colored reaction solution, under vigorous stirring, is poured into 500 ml. of a 15% sodium sulfite solution whereupon decoloration occurs. After a further addition of water the mixture is extracted several times with ether. Thereafter the combined neutral ether extracts are dried and concentrated. The resulting 2-O-methyl-3,5,6-tri-O-benzyl-γ-D-gluconolactone can be used directly for further reaction without purification.

2-O-methyl-3,5,6-tri-O-benzyl-D-glucon-N-methylamide 200 g. of 2-O-methyl-3,5,6-tri-O-benzyl-γ-D-gluconolactone is dissolved in 1500 ml. of absolute methanol in a round-bottom flask fitted with stirrer, thermometer and gas inlet tube and the solution cooled to 0°. Into the solution, under vigorous stirring, 100 g. of gaseous methylamine is introduced during the course of 1 to 1.5 hours. After several hours additional stirring the mixture is diluted with water and extracted with ether. The ether extracts are combined and treated successively with dilute sulfuric acid, dilute sodium carbonate, washed with water, dried with sodium sulfate, and concentrated. The residue consists of 200 g. of D-glucon-N-methylamide in the form of a viscous oil.

*2-O-methyl-3,5,6-tri-O-benzyl-4-O-mesyl-O-glucon-N-methylamide*

200 g. of the above obtained D-glucon-N-methylamide is dissolved in 2000 ml. of methylene chloride and cooled to 0°. To this solution 320 ml. of absolute pyridine is added, and thereafter, during the course of 1 to 1.5 hours, a solution of 32 ml. of mesyl chloride in 50 ml. of methylene chloride is added dropwise thereto. After severals hours' additional stirring the same quantity of mesyl chloride is added again and the stirring continued for several additional hours. After the addition of water the methylene chloride solution is treated with dilute sulfuric acid, then with dilute sodium carbonate solution, and lastly washed with water, dried and concentrated. To the still warm residue there is added carefully with shaking 700 ml. of ether and the mixture cooled rapidly. The mesylate begins to crystallize immediately. After a short period of time, standing at a temperature of 0°, the mixture is filtered by suction, the precipitate washed with ether and dried. 140 g. of the mesylate having a M.P. of 129–131° C. is obtained.

*2-O-methyl-3,5,6-tri-O-benzyl-γ-D-galactonolactone*

300 g. of 2-O-methyl-3,5,6-tri-O-benzyl-4-O-mesyl-D-glucon-N-methylamide is dissolved in 3000 ml. of 66% acetic acid and heated during 15 hours and under reflux. The solution is cooled and the solvent distilled off under the vacuum of a water pump at bath temperature of 70° C. The residue, a viscous oil, is diluted with water and taken up in ether. The ether solution is first washed with dilute sodium carbonate solution, then with water, and then dried and concentrated. The resulting crude product is dissolved in benzene/ether (95:5) mixture for purification purposes, adsorbed on a 5-fold quantity of silica gel (Merck No. 7733) and eluted with a mixture of benzene/ether (95:5). After concentration of the solvent 220 g. of 2-O-methyl-3,5,6-tri-O-benzyl-γ-D-galactonolactone is obtained as a viscous oil; $[\alpha]_D^{24}=45°$ (c.=4 in chloroform).

EXAMPLE 2

*1,1-dimethyl-2-O-methyl-3,5,6-tri-O-benzyl-D-galactonohexitol*

In a 4-liter round-bottom flask fitted with stirrer, condenser, thermometer and dropping funnel, 21.2 g. of magnesium, 122 g. of methyl iodide and 1000 ml. of dry ether are introduced to form a Grignard compound. To this mixture, under cooling to a temperature of 20–25°, a solution of 100 g. of 2-O-methyl-3,5,6-tri-O-benzyl-γ-D-galactonolactone and 900 ml. of dry benzene is dropped in over the course of 30 minutes. After stirring for several hours at room temperature the slightly yellow colored and somewhat turbid solution is hydrolyzed carefully by the addition of 500 ml. of 3 N sulfuric acid while the temperature of the mixture is maintained by cooling between 20 and 30° C. After the addition of an additional quantity of ether the aqueous phase is separated and the ether solution washed consecutively with water and a 10% aqueous sodium thiosulfate solution, dried, and completely concentrated. 102 g. of a viscous yellow oil having a specific rotation of $[\alpha]_D^{24}=$ between —49.5 to —51.5 (c.=4 in chloroform) is obtained.

EXAMPLE 3

*1,1-dimethyl-1,4-di-O-tetrahydropyranyl-2-O-methyl-3,5,6-tri-O-benzyl-D-galactonohexitol*

8.0 g. of the hydrolysis product obtained in Example 2 is dissolved in 50 ml. of freshly distilled dihydropyran and reacted with 50 mg. of p-toluenesulfonic acid. After standing for several hours the solution is neutralized by the dropwise addition of dilute sodium hydroxide and the neutralized solution treated with water and ether. After the usual work up the reaction product is obtained from the ether solution in quantitative yield, which is then purified by dissolving in benzene and chromatographed on a 20-fold quantity of aluminum oxide (activity III).

EXAMPLE 4

*1,1-dimethyl-2-O-methyl-3,5,6-tri-O-benzyl-4-O-benzoyl-D-galactonohexitol*

200 g. of the hydrolysis product obtained in Example 2 is dissolved in 800 ml. of dry pyridine and cooled to 0–5° C. To this solution, maintained at that temperature, 83 ml. of benzoyl chloride in 100 ml. of pyridine is dropped therein during the course of 30 minutes. After stirring for several hours ice-water and ether are added thereto and the ether solution, after washing with dilute sulfuric acid and dilute sodium hydroxide, is worked up as usual. There is obtained an almost quantitative yield of a viscous, bright-yellow oil having a specific rotation $[\alpha]_D^{22}=$ between —5° and —7° (c.=4 in chloroform).

EXAMPLE 5

*1,1-dimethyl-2-O-methyl-4-O-benzoyl-D-galactonohexitol*

In a refrigerated 5-liter hydrogenation flask 204 g. of 1,1 - dimethyl-2-O-methyl-3,5,6-tri-O-benzyl-4-O-benzoyl-D-galactonohexitol is dissolved in 1900 ml. of methanol. To this solution is added 20 g. of Dry Ice. When the flask is filled with carbon dioxide gas, 15 g. of 5% palladium on charcoal is added to the solution and the mixture hydrogenated at room temperature. After about 2 hours the theoretical quantity of hydrogen is taken up. The catalyst is filtered from the solution and the solution concentrated completely at a 40–45° bath temperature under vacuum. The resulting still warm oil is taken up in 200 ml. of ether and shaken vigorously, whereupon spontaneous crystallization occurs. After allowing the mixture to stand for several hours the crystalline product is filtered off and dried, yield 74 g. of product, M.P. 118–121° C.; $[\alpha]_D^{22}=+40$ to $+43°$ (c.=1 in chloroform).

EXAMPLE 6

*5,5-dimethyl-4-O-methyl-2-O-benzoyl-L-lyxopyranose*

39.6 g. of the substituted D-galactonohexitol ogtained in Example 5 is dissolved in 600 ml. of dry methylene chloride. Into this clear solution a solution of 56 g. of lead tetraacetate in 300 ml. of dry methylene chloride is dropped therein during the course of 1 hour at room temperature. The precipitating lead diacetate colors the reaction solution brown. The reaction solution is stirred for several more hours at room temperature. A slight excess of lead tetraacetate, which is detected through blue coloration of moistened iodine-starch paper, is present. After destruction of the excess lead tetraacetate through dropwise addition of ethylene glycol, the reaction solution is filtered, washed successively with aqueous sodium carbonate solution and sodium chloride solution, dried, and completely concentrated. 35 g. of 5,5-dimethyl-4-O-methyl-2-O-benzoyl-L-lyxopyranose in the form of a colorless oil remains behind.

A crystalline derivative of the L-lyxopyranose is obtained if a p-benzoylaminobenzoyl group is introduced into the 2-position. The 5,5-dimethyl-4-O-methyl-2-O-(p-benzoylamino)-benzoyl-L-lyxopyranose melts at 227–228° with decomposition and exhibits a specific rotation of $[\alpha]_D^{22}=+51.4°$ (c.=0.532 in methanol).

This crystalline derivative is obtained as follows:

The hydrolysis product, obtained according to the process of Example 2, is esterified, according to the instructions in Example 4, with p-nitrobenzoyl chloride;

the 4-O-p-nitrobenzoyl derivative is then catalytically reduced in the presence of Raney nickel to the 4-O-aminobenzoyl derivative; and upon this, after benzoylation in pyridine, debenzylation and glycol splitting reaction are undertaken as in Examples 5 and 6.

EXAMPLE 7

*5,5-dimethyl-4-O-methyl-2-O-benzoyl-methyl-L-lyxopyranoside*

In a 500-ml. round-bottom flask fitted with a reflux condenser and a dropping funnel, 36 g. of the L-lyxopyranose obtained in Example 6 is dissolved in 240 ml. of dry methanol and the mixture brought to the boiling point. Through the dropping funnel, the end of which is just above the surface of the liquid in the flask, 2.4 ml. of freshly distilled acetyl chloride is dropped therein during the course of 5 minutes. The solution is maintained for 4 hours at the boiling temperature; thereafter, cooled slightly; and under the vacuum of a water pump, completely concentrated. The oily residue is taken up in ether. The ether solution is washed with 4% sodium bicarbonate solution and then water, treated with sodium sulfate and evaporated to dryness. 34.1 g. of a glassy yellow oil, 5,5-dimethyl-4-O-methyl-2-O-benzoyl-methyl-L-lyxopyranoside, is obtained, $[\alpha]_D^{22} = +52°$ to $+57°$ (c.=1 in ethanol).

Variations in the process of the invention can be undertaken by those skilled in the art without departing from the scope or spirit of the invention.

The following additional Examples A and B illustrate the conversion of certain compounds of the invention into noviose and methyl novioside.

A. 3.1 g. of 5,5-dimethyl-4-O-methyl-2-O-benzoyl-L-lyxopyranose (obtained from Example 6) is added to 54 ml. of a 0.2 N hydroalcoholic sodium hydroxide solution (1 part of volume of water to 4 parts of volume of ethanol) and the mixture left standing for 15 hours at 0°. After this time the reaction mixture is neutralized carefully by adding 3 N sulfuric acid and evaporated to dryness under the vacuum of a water pump. The residue is extracted with ethanol, the solution is treated with activated carbon and, after the separation of the latter, concentrated. 1.4 g. 5,5-dimethyl-4-O-methyl-L-lyxopyranose (noviose) is obtained in form of a slightly yellow oil which crystallizes upon treatment with a mixture of ethyl acetate/cyclohexane. It is recrystallized three times; M.P. 133–134°; $[\alpha]_D = +22.6°$ (c.=1 in ethanol-water 1:1). The M.P. of a mixture of this compound with a sample of noviose obtained by degradation of novobiocin shows no depression.

B. 48 g. of 5,5-dimethyl-4-O-methyl-2-O-benzoyl-methyl-L-lyxopyranoside (obtained from Example 7) is dissolved in 150 ml. of a 2 N hydroalcoholic sodium hydroxide solution (1 part of volume of water to 4 parts of volume of methanol) and kept under reflux for 4 hours. After this time the reaction mixture is neutralized carefully by adding 2 N sulfuric acid and evaporated to dryness. The residue is extracted several times with anhydrous ethanol. The combined extracts are concentrated and the resulting concentrate is again extracted with anhydrous benzene. After evaporation of the benzene there remains 25 g. of 5,5-dimethyl-4-O-methyl-methyl-L-lyxopyranoside (methyl novioside) in form of an oil. The I.R. absorption spectrum of this substance does not show anymore the characteristic carbonyl absorption band at 1720 cm.$^{-1}$.

We claim:
1. 2 - O - lower alkyl - 3,5,6 - tri - O - benzyl - γ - D-galactonolactone.
2. 2 - O - methyl - 3,5,6 - tri - O - benzyl - γ - D-galactonolactone.
3. A process for the preparation of a 2-O-lower alkyl-3,5,6-tri-O-benzyl-γ-D-galactonolactone comprising the step of treating at a temperature in the range of from about 25 to about 100° C. a compound selected from the group consisting of (a) a 2-O-lower alkyl-3,5,6-tri-O-benzyl-D-gluconic acid substituted in the 4-position with a sulfonic acid moiety selected from the group consisting of aliphatic and aromatic hydrocarbon sulfonic acid moieties, (b) an amide thereof selected from the group consisting of unsubstituted, N-mono-lower alkyl substituted, and N,N-dilower alkyl substituted amides, (c) a lower alkyl ester thereof, and (d) the nitrile thereof with acetic acid containing at least one mole of water per mole of acetic acid.
4. A process according to claim 3 wherein the 4-position of said compound is esterified with methane sulfonic acid.
5. A process according to claim 3 wherein the 4-position of said gluconic acid is esterified with a phenyl sulfonic acid substituted with a substituent selected from the group consisting of lower alkyl and halo substituents.
6. A process according to claim 3 wherein the starting material is 2-O-methyl-3,5,6-tri-O-benzyl-4-O-mesyl-D-glucon-N-methylamide.

References Cited by the Examiner

Hedenburg, J.A.C.S., vol. XXXVII, pp. 345–372 (1915).
Tipson: Advances in Carbohydrate Chemistry, vol. 8, pp. 166–173 (1953).
Frush et al.: J.A.C.S., vol. 78, pp. 2844–2846 (1956).
Jones et al.: J.A.C.S., vol. 79, pp. 2787–2793 (1957).
Hinman et al.: J.A.C.S., vol. 79, pp. 3789–3800 (1957).
Fieser et al.: Advanced Organic Chemistry, p. 310, Reinhold Publishing Corp., New York (1961).

IRVING MARCUS, *Primary Examiner.*

A. LOUIS MONACELL, WALTER A. MODANCE,
*Examiners.*

United States Patent Office
CERTIFICATE OF CORRECTION

Patent No. 3,183,247

May 11, 1965

Joseph Kiss et al.

It is hereby certified that error appears in the above numbered patent requiring correction and that the said Letters Patent should read as corrected below.

Column 4, line 27, for "-γ-gluconolactone", in italics, read -- -γ-D-gluconolactone --, in italics; column 5, line 8, for "-mesyl-O-glucon-", in italics, read -- -mesyl-D-glucon- --, in italics; line 44, for "=45°" read -- =-45° --; column 6, line 49, for "ogtained" read -- obtained --; column 8, line 8, for "(methyl)" read -- (methyl --.

Signed and sealed this 5th day of October 1965.

(SEAL)
Attest:

ERNEST W. SWIDER
Attesting Officer

EDWARD J. BRENNER
Commissioner of Patents